United States Patent [19]
White et al.

[11] Patent Number: 5,574,928
[45] Date of Patent: Nov. 12, 1996

[54] MIXED INTEGER/FLOATING POINT PROCESSOR CORE FOR A SUPERSCALAR MICROPROCESSOR WITH A PLURALITY OF OPERAND BUSES FOR TRANSFERRING OPERAND SEGMENTS

[75] Inventors: Scott A. White; Michael D. Goddard; William M. Johnson, all of Austin, Tex.

[73] Assignee: Advanced Micro Devices, Inc., Sunnyvale, Calif.

[21] Appl. No.: 233,563

[22] Filed: Apr. 26, 1994

Related U.S. Application Data

[63] Continuation-in-part of Ser. No. 146,382, Oct. 29, 1993, abandoned.

[51] Int. Cl.[6] .................................................. G06F 13/38
[52] U.S. Cl. ................... 395/800; 395/185.03; 395/306; 395/376; 364/748
[58] Field of Search ........................... 364/748; 395/275, 395/375, 800, 185.03, 306, 375

[56] References Cited

U.S. PATENT DOCUMENTS

| | | | |
|---|---|---|---|
| 3,781,808 | 12/1973 | Ahearn et al. | 395/417 |
| 4,044,338 | 8/1977 | Wolf | 365/49 |
| 4,161,784 | 7/1979 | Cushing et al. | 364/748 |
| 4,736,288 | 4/1988 | Shintani et al. | 395/375 |
| 4,780,819 | 10/1988 | Kashiwagi | 364/200 |

(List continued on next page.)

FOREIGN PATENT DOCUMENTS

| | | |
|---|---|---|
| 0381471 | 8/1990 | European Pat. Off. . |
| 2281422 | 3/1995 | United Kingdom . |
| 93/01546 | 1/1993 | WIPO . |

OTHER PUBLICATIONS

Toyohiko Yoshida, et al., "The Approach to Multiple Instruction Execution in the GMICRO/400 Processor", IEEE, ©1991, pp. 185–195.

Gurindar S. Sohi, "Instruction Issue Logic for High–Performance, Interruptible, Multiple Functional Unit, Pipelined Computers", IEEE Transaction on Computers, vol. 39, No. 3, ©1990, pp. 349–359.

Bruce D. Lightner and Gene Hill, "The Metaflow Lightning Chipset", IEEE Proceedings ConpCom Spring '91, Feb. 1991, pp. 13–18.

R. M. Tomasulo, "An Efficient Algorithm for Exploiting Multiple Arithmetic Units", IBM Journal, Jan. 1967, vol. 11, pp. 25–32.

(List continued on next page.)

*Primary Examiner*—Ken S. Kim
*Attorney, Agent, or Firm*—Skjerven, Morrill, MacPherson, Franklin & Friel

[57] ABSTRACT

A processor core for supporting the concurrent execution of mixed integer and floating point operations includes integer functional units (110) utilizing 32-bit operand data and a floating point functional unit (22) utilizing up to 82-bit operand data. Eight operand busses (30, 31) connect to the functional units to furnish operand data, and five result busses (32) are connected to the functional units to return results. The width of the operand busses is 41 bits, which is sufficient to communicate either integer or floating point data. This is done using an instruction decoder (18) to apportion a floating point operation which operates on 82-bit floating point operand data into multiple suboperations each associated with a 41-bit suboperand. The operand busses and result busses have an expanded data-handling dimension from the standard integer data width of 32 bits to 41 bits for handling the floating point operands. The floating point functional unit recombines the suboperand data into 82-bits for execution of the floating point operation, and partitions the 82-bit result for output to the result busses. In addition, the excess capacity of the result busses during integer transfers is used to communicate integer flags.

4 Claims, 13 Drawing Sheets

U.S. PATENT DOCUMENTS

| | | | |
|---|---|---|---|
| 4,807,115 | 2/1989 | Torng | 395/375 |
| 4,928,223 | 5/1990 | Dao et al. | 395/375 |
| 4,940,908 | 7/1990 | Tran | 307/443 |
| 4,992,934 | 2/1991 | Portanova et al. | 395/375 |
| 5,053,631 | 10/1991 | Perlman et al. | 364/748 |
| 5,056,006 | 10/1991 | Acharya et al. | 395/425 |
| 5,058,048 | 10/1991 | Gupta et al. | 364/748 |
| 5,077,692 | 12/1991 | McMinn | 364/569 |
| 5,095,458 | 3/1992 | Lynch et al. | 364/787 |
| 5,128,888 | 7/1992 | Tamura et al. | 364/748 |
| 5,128,891 | 7/1992 | Lynch et al. | 364/767 |
| 5,129,067 | 7/1992 | Johnson | 395/375 |
| 5,136,697 | 8/1992 | Johnson | 395/375 |
| 5,155,816 | 10/1992 | Kohn | 395/375 |
| 5,155,820 | 10/1992 | Gibson | 395/375 |
| 5,157,780 | 10/1992 | Stewart et al. | 395/183.07 |
| 5,185,868 | 2/1993 | Tran | 395/375 |
| 5,206,828 | 4/1993 | Shah et al. | 364/784 |
| 5,222,230 | 6/1993 | Gill et al. | 395/550 |
| 5,226,126 | 7/1993 | McFarland et al. | 395/375 |
| 5,226,130 | 7/1993 | Favor et al. | 395/375 |
| 5,237,700 | 8/1993 | Johnson et al. | 395/775 |
| 5,247,644 | 9/1993 | Johnson et al. | 395/484 |
| 5,251,306 | 10/1993 | Tran | 395/375 |
| 5,467,473 | 11/1995 | Kahle et al. | 395/800 |

OTHER PUBLICATIONS

Brian Case, "AMD Unveils First Superscalar 29K Core", *Microprocessor Report*, Oct. 24, 1994, pp. 23–26.

Michael Slater, "AMD's K5 Designed to Outrun Pentium", *Microprocessor Report*, Oct. 24, 1994, pp. 1, 6–11.

Mike Johnson, "Superscalar Microprocessor Design", (Prentice Hall series in innovative technology), 1991.

U.S. Patent Application Ser. No. 07/929,770 filed Apr. 12, 1992 entitled "Instruction Decoder and Superscalar Processor Utilizing Same"—David B. Witt and William M. Johnson.

U.S. Patent Application Ser. No. 08/145,902 filed Oct. 29, 1993 entitled "Speculative Instruction Queue and Method Therefor Particularly Suitable for Variable Byte–Length Instructions"—David B. Witt, Attorney Docket M–2279 US.

U.S. Patent Application Ser. No. 08/145,905 filed Oct. 29, 1993 entitled "Pre–Decoded Instruction Cache and Method Therefor Particularly Suitable for Variable Byte–Length Instructions"—David B. Witt and Michael D. Goddard, Attorney Docket M–2278 US.

U.S. Patent Application Ser. No. 08/146,376 filed Oct. 29, 1993 entitled "High Performance Load/Store Functional Unit and Data Cache"—William M. Johnson, David B. Witt, and Murali Chinnakonda, Attorney Docket M–2281 US.

U.S. Patent Application Ser. No. 08/146,382 filed Oct. 29, 1993 entitled "High Performance Superscalar Microprocessor"—David B. Witt and William M. Johnson, Attorney Docket M–2518 US.

U.S. Patent Application Ser. No. 08/146,383 filed Oct. 29, 1993 entitled "Superscalar Instruction Decoder"—David B. Witt and Michael D. Goddard, Attorney Docket M–2280 US.

REGISTER FILE ARRAY 62

| BITS 8:7<br>BITS 6:3 | 00<br><31:0> | 01<br><40:0> | 10<br><40:0> | | 11<br><40:0> | |
|---|---|---|---|---|---|---|
| 0000 |  | EAX | — | (L) | FP0 | (H) |
| 0001 |  | ECX | — | (L) | FP1 | (H) |
| 0010 |  | EDX | — | (L) | FP2 | (H) |
| 0011 |  | EBX | — | (L) | FP3 | (H) |
| 0100 |  | ESP | — | (L) | FP4 | (H) |
| 0101 |  | EBP | — | (L) | FP5 | (H) |
| 0110 |  | ESI | — | (L) | FP6 | (H) |
| 0111 |  | EDI | — | (L) | FP7 | (H) |
| 1000 | ETMP0 | ETMP8 | (L) | FTMP0 | (H) |
| 1001 | ETMP1 | ETMP9 | (L) | FTMP1 | (H) |
| 1010 | ETMP2 | ETMP10 | (L) | FTMP2 | (H) |
| 1011 | ETMP3 | ETMP11 | (L) | FTMP3 | (H) |
| 1100 | ETMP4 | ETMP12 | (L) | FTMP4 | (H) |
| 1101 | ETMP5 | ETMP13 | (L) | FTMP5 | (H) |
| 1110 | ETMP6 | ETMP14 | (L) | FTMP6 | (H) |
| 1111 | ETMP7 | ETMP15 | (L) | FTMP7 | (H) |
|  | <40:0> | | <81:0> | | | |

FIG. 4

| DISPATCH POS | OPCODE/TYPE | A-OPERAND | B-OPERAND |
| --- | --- | --- | --- |
| 1 | FPFILL | <40:0> | <40:0> |
| 2 | FADD | <81:41> | <81:41> |
| 3 | — | — | — |
| 4 | — | — | — |

FIG. 18

MIXED INTEGER/FLOATING POINT PROCESSOR CORE FOR A SUPERSCALAR MICROPROCESSOR WITH A PLURALITY OF OPERAND BUSES FOR TRANSFERRING OPERAND SEGMENTS

RELATED APPLICATIONS

This application is a continuation-in-part of application Ser. No. 08/146,382 filed on Oct. 29, 1993, now abandoned.

BACKGROUND OF THE INVENTION

1. Field of the Invention

The present invention relates to a processor architecture, and more particularly to a processor architecture combining floating point functional units and non-floating point functional units.

2. Description of the Related Art

Processors generally process a single instruction of an instruction set in several steps. Early technology processors performed these steps serially. Advances in technology have led to pipelined-architecture processors, which may be called scalar processors, which perform different steps of many instructions concurrently. A "superscalar" processor is also implemented using a pipelined structure, but further improves performance by supporting concurrent execution of scalar instructions.

In a superscalar processor, instruction conflicts and dependency conditions arise in which an issued instruction cannot be executed because necessary data or resources are not available. For example, an issued instruction cannot execute when its input operands are dependent upon data calculated by other instructions that have not yet completed execution.

Superscalar processor performance is improved by the speculative execution of branching instructions and by continuing to decode instructions regardless of the ability to execute instructions immediately. Decoupling of instruction decoding and instruction execution requires a buffer between the processor's instruction decoder and the circuits, called functional units, which execute instructions.

Floating point functionality has been available in nonsuperscalar computers and processors for many years. Microprocessors typically perform floating point and integer instructions by activating separate floating point and integer circuits. A standard for floating point arithmetic has been published by Institute of Electrical and Electronic Engineers in "IEEE Standard For Binary Floating-Point Arithmetic", ANSI/IEEE Standard 754-1985, IEEE Inc., 1985. This standard is widely accepted and it is advantageous for a processor to support its optional extended floating point format.

Some computers employ separate main processor and coprocessor chips. The main processor reads and writes to a floating point register stack to effect floating point operations. For example, an 80386 main processor, which is a scalar microprocessor and an 80387 math coprocessor are available from various manufacturers. The math coprocessor controls floating point operations initiated upon a request from a main processor. The main processor accesses a register stack, which includes eight registers for holding up to eight floating point values that are stored in double extended format. A 32-bit single precision or 64-bit double precision value is loaded from memory and expanded to 80-bit double extended format. Conversely, the double extended value is shortened and rounded to a single or double precision value as it is stored in memory.

A Pentium™ microprocessor, available from Intel Corporation of Santa Clara, Calif., is a superscalar processor which executes mixed floating point and integer instructions by controlling the operation of two instruction pipelines. One of the pipelines executes all integer and floating point instructions. The second pipeline executes simple integer instructions and a floating point exchange instruction.

It is desirable to incorporate a floating point functional unit with several integer functional units in a superscalar processor. W. M. Johnson in *Superscalar Processor Design*, Englewood Cliffs, N.J., Prentice Hall, 1991, p. 45, provides two sets of processor functional blocks, an integer set structured on 32-bit units and busses and a floating point set organized into 80-bit structures. In a superscalar processor, the floating point and integer sets each require separate register files, reorder buffers and operand and result busses. Floating point instructions are dispatched by an instruction decoder within the floating point set. A separate instruction decoder is provided in the integer set of units. The Johnson approach supports floating point arithmetic in a processor which incorporates a superscalar architecture, decoupling of instruction decoding and instruction execution, and branch prediction. The considerable performance advantages of this approach are achieved at the expense of duplicating resources. Moreover, some reduction in performance arises from coordination of operations between the integer and floating point sets of functional blocks.

SUMMARY OF THE INVENTION

The present invention is a processor and architecture having an internal machine organization for improved handling of integer and floating point data which better realizes the advantages of a superscalar architecture, decoupling of instruction decoding and instruction execution, and branch prediction.

The superscalar processor and architecture of the present invention support integer and IEEE extended floating point format standard arithmetic while advantageously avoiding duplication of functional blocks such as decoders, register files, reorder buffers and associated operand and result busses. Preventing resource duplication reduces production and operating costs, circumvents complexity arising from interactions between duplicated resources and facilitates control of timing relationships between operations performed by the different sets of functional blocks.

The architecture of the present invention advantageously incorporates handling of integer and floating point data in a pipelined or superscalar processor in which either integer data or floating point data flows in any data path of a set of multiple data paths under common control in a common general manner.

It is a particular advantage of the superscalar processor of the present invention to manage unresolved data dependencies using a single reorder buffer memory for storing dependency and tagging information for both integer and floating point operations. One function of a reorder buffer is to maintain the order of dispatched operations, including the order of interspersed integer and floating point operations. A single reorder buffer maintains the operation order in a simple manner. In contrast, a processor having separate integer and floating point reorder buffers requires extensive cross-referencing to maintain the operation order.

In addition, the performance of the superscalar processor of the present invention is advantageously enhanced by implementing a single reorder buffer to manage speculative execution of intermixed integer and floating point operations using branch prediction and recovery. A single reorder buffer maintains the order of integer, floating point and branch operations. The position of a branch instruction with respect to other entries in the reorder buffer is rendered by a pointer. Thus, the instruction sequence is reflected in a single sequence of reorder buffer entries, with a single branch pointer. Flushing the speculative state after a mispredicted branch may be easily achieved by changing as little as a single memory during recovery after a mispredicted branch, without regard for the type of data stored and without the need for complex control structures or serialization of instructions.

The processor and architecture of the present invention achieve these advantages by supplying a new processor core for concurrently executing mixed integer and floating point operations, including a first functional unit utilizing operand data of a first size and a second functional unit utilizing operand data of a second size. Several operand busses connect to the functional units to furnish data. The width of the operand busses is sufficient to communicate either first or second size data.

Another embodiment of the invention is a method for communicating operand data in a processor for implementing a mixed instruction set. This instruction set defines operations executing on a first type (e.g. integer) of functional unit utilizing operand data of a first size (e.g. 32 bits) and operations executing on a second type (e.g. floating point) of functional unit utilizing operand data of a second size (e.g. 80 or more bits) greater than the first size. The method includes the step of apportioning a second type of operation of into a plurality of suboperations, each of which is associated with suboperand data of a size proportionately smaller than the second size (e.g. 40 or more bits). The method also includes the step of dispatching the plurality of suboperations and associated suboperand data to the functional unit of the second type with the suboperand data being communicated on busses of a third size (e.g. 40 or more bits) that accommodates either the first size or the apportioned second size. Additional steps of the method include recombining the dispatched suboperand data into operand data of the second size and executing the apportioned operation to generate a result of the second size.

An additional embodiment of the invention is a processor for executing, in parallel, several operations utilizing either integer or floating point operand data. The processor includes a decoder for decoding and dispatching several operations. The decoder includes circuits for partitioning each floating point operation into multiple associated suboperations, each of which is associated with a floating point suboperand, which are dispatched in parallel. The processor also includes a floating point functional unit, which is coupled to the decoder to receive control signals including the dispatched suboperations. The functional unit includes circuits for recombining the suboperand data, executing the floating point suboperations in a single operation which utilizes the recombined data and circuits for partitioning the execution result into multiple subresults.

BRIEF DESCRIPTION OF THE DRAWINGS

The present invention is better understood and its advantages, objects and features made better apparent by making reference to the following description, taken in conjunction with the accompanying drawings, in which like reference numbers identify like elements, wherein:

FIG. 4 is a pictorial representation illustrating a memory format in the register file shown in FIG. 3;

FIG. 18 is a table which illustrates segmentation of floating point operations and operands into a pair of suboperations and associated suboperands.

DETAILED DESCRIPTION OF THE PREFERRED EMBODIMENT

Figure 1A:
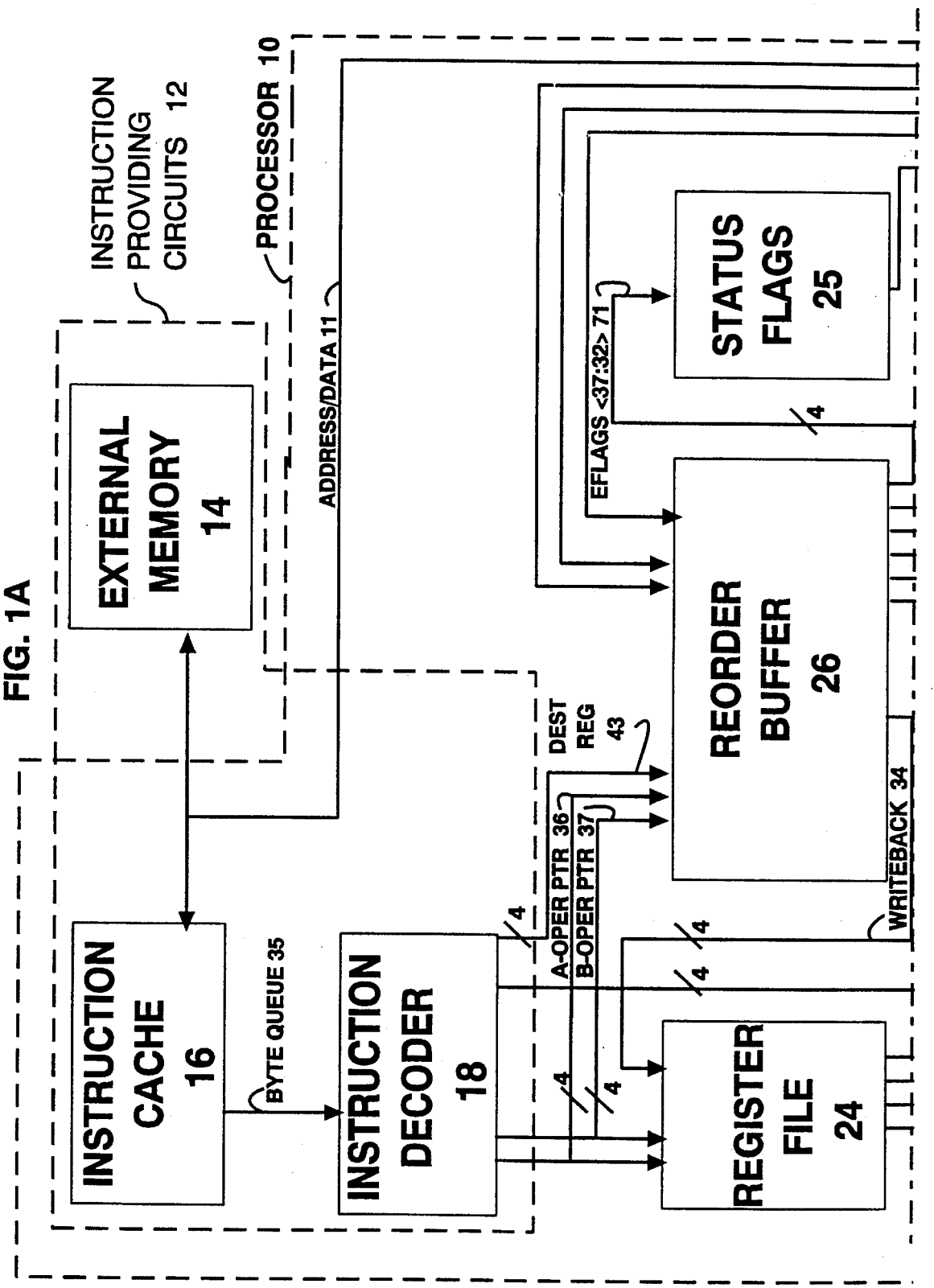
FIG. 1 is a architecture-level block diagram of a processor for implementing a mixed integer/floating point core.
Figure 1B:
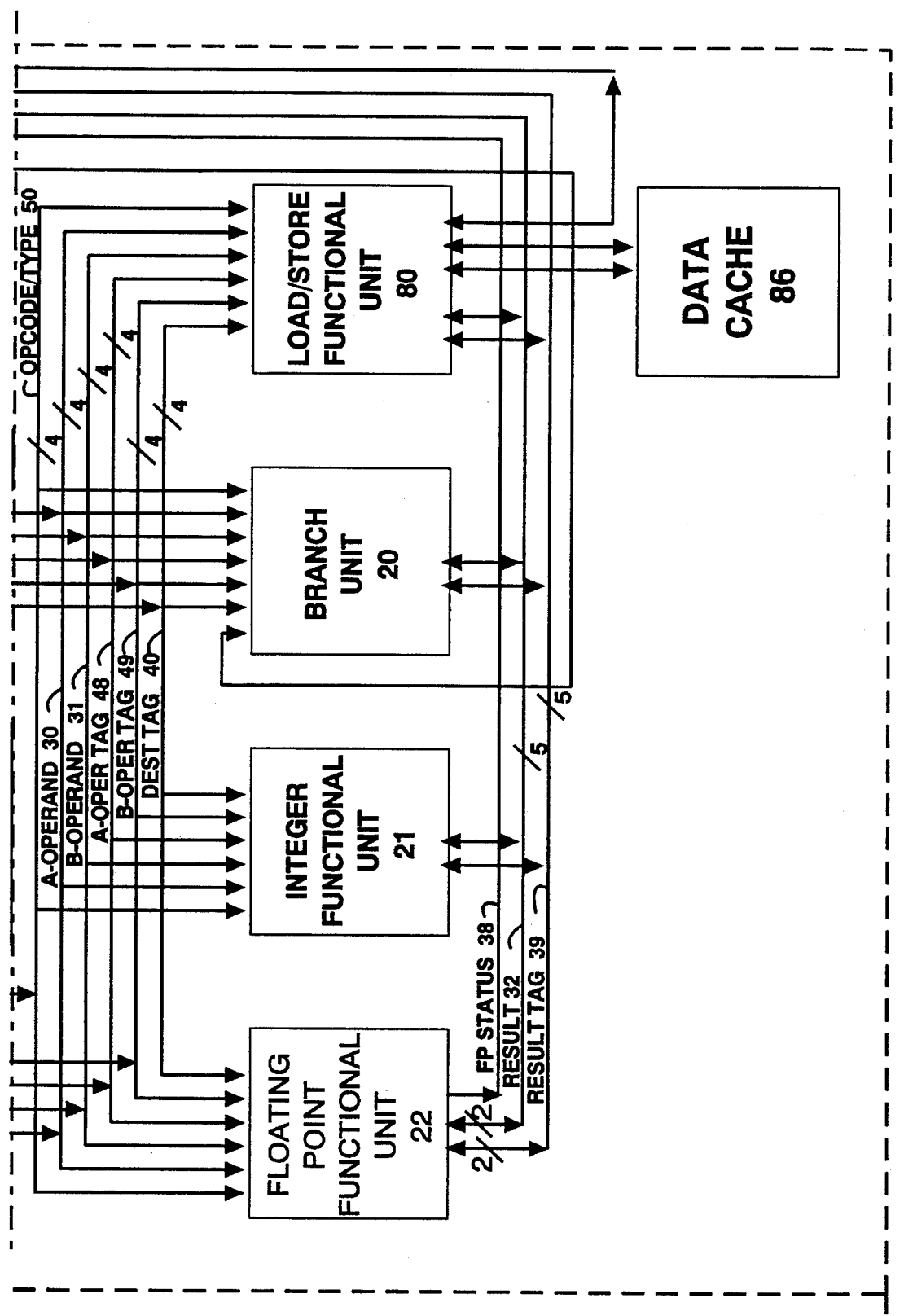

The architecture and functional blocks of a superscalar processor 10 having an instruction set for executing integer and floating point operations are shown in FIG. 1. A 64-bit internal address and data bus 11 communicates address, data, and control transfers among various functional blocks of the processor 10 and an external memory 14. An instruction cache 16 parses and pre-decodes CISC instructions. A byte queue 35 transfers the predecoded instructions to an instruction decoder 18, which maps the CISC instructions to respective sequences of instructions for RISC-like operations ("ROPs"). The instruction decoder 18 generates type, opcode, and pointer values for all ROPs based on the pre-decoded CISC instructions in the byte queue 35. It is to be understood that, while the illustrative embodiment shows a processor 10 for receiving stored complex instructions and converting the complex (CISC) instructions to RISC-type ROPs for execution, processors that operate either exclusively on CISC instructions or RISC-type operations, as well as to processors that change the form of the instruction upon decoding, are also envisioned.

A suitable instruction cache 16 is described in further detail in U.S. patent application Ser. No. 08/145,905 filed on Oct. 29, 1993 (David B. Witt and Michael D. Goddard, "Pre-Decode Instruction Cache and Method Therefor Particularly Suitable for Variable Byte-Length Instructions", Attorney Docket Number M-2278). A suitable byte queue 35 is described in additional detail in U.S. patent application Ser. No. 08/145,902 filed on Oct. 29, 1993, now abandoned (David B. Witt "Speculative Instruction Queue and Method Therefor Particularly Suitable for Variable Byte-Length Instructions", Attorney Docket Number M-2279). A suitable instruction decoder 18 is described in further detail in U.S. patent application Ser. No. 08/146,383 filed on Oct. 29, 1993 (David B. Witt and Michael D. Goddard "Superscalar Instruction Decoder", Attorney Docket Number M-2280). Each of the identified patent applications is incorporated herein by reference in its entirety.

The instruction decoder 18 dispatches ROP operations to functional blocks within the processor 10 over various busses. The processor 10 supports four ROP issue, five ROP results, and the results of up to sixteen speculatively executed ROPs. Up to four sets of pointers to the A and B source operands and to a destination register are furnished over respective A-operand pointers 36, B-operand pointers 37 and destination register pointers 43 by the instruction decoder 18 to a register file 24 and to a reorder buffer 26. The register file 24 and reorder buffer 26 in turn furnish the appropriate "predicted executed" versions of the RISC operands A and B to various functional units on four pairs of 41-bit A-operand busses 30 and 41-bit B-operand busses 31. Associated with the A and B-operand busses 30 and 31 are operand tag busses, including four pairs of A-operand tag busses 48 and B-operand tag busses 49. When a result is unavailable for placement on an operand bus, a tag that identifies an entry in the reorder buffer 26 for receiving the result when it becomes available is loaded onto a corresponding operand tag bus. The four pairs of operand and operand tag busses correspond to four ROP dispatch positions. The instruction decoder, in cooperation with the reorder buffer 26, specifies four destination tag busses 40 for identifying an entry in the reorder buffer 26 that will receive results from the functional units after an ROP is executed. Functional units execute an ROP, copy the destination tag onto one of five result tag busses 39, and place a result on a corresponding one of five result busses 32 when the result is available. A functional unit directly accesses a result on result busses 32 when a corresponding tag on result tag busses 39 matches the operand tag of an ROP awaiting the result.

The instruction decoder 18 dispatches opcode information, including an opcode on an opcode type, that accompanies the A and B source operand information via four opcode/type busses 50.

Processor 10 includes several functional units, such as a branch unit 20, an integer functional unit 21, a floating point functional unit 22 and a load/store functional unit 80. Integer functional unit 21 is presented in a generic sense and represents units of various types such as arithmetic logic units, a shift unit, and a special register unit. Branch unit 20 validates the branch prediction operation, a technique which allows an adequate instruction-fetch rate in the presence of branches and is needed to achieve performance with multiple instruction issue. A suitable branch prediction system, including a branch unit 20 and instruction decoder 18, is described in further detail in U.S. Pat. No. 5,136,697 (William M. Johnson "System for Reducing Delay for Execution Subsequent to Correctly Predicted Branch Instruction Using Fetch Information Stored with each Block of Instructions in Cache"), which is incorporated herein by reference in its entirety.

Processor 10 is shown having a simple set of functional units to avoid undue complexity. It will be appreciated that the number and type of functional units are depicted herein in a specified manner, with a single floating point functional unit 22 and multiple functional units 20, 21 and 22 which generally perform operations on integer data, but other combinations of integer and floating point units may be implemented, as desired. Each functional unit 20, 21, 22 and 80 has respective reservation stations (not shown) having inputs connected to the operand busses 30 and 31 and the opcode/type busses 50. Reservation stations allow dispatch of speculative ROPs to the functional units.

Register file 24 is a physical storage memory including mapped CISC registers for integer and floating point instructions. It also includes temporary integer and floating point registers for holding intermediate calculations. Register file 24 handles both floating point and integer data. Integers are positioned in the lower order 32 bits of the register file 24 <31:0>. Higher order bits <40:32> are not implemented in the integer registers of the register file 24. The register file 24 functions the same for integer or floating point data. Register file 24 receives results of executed and nonspeculative operations from the reorder buffer 26 over four writeback busses 34, in a process known as retiring results.

Reorder buffer 26 is a circular FIFO for keeping track of the relative order of speculatively executed ROPs. The reorder buffer storage locations are dynamically allocated, for sending retiring results to register file 24 and for receiving results from the functional units. When an instruction is decoded, its result value is allocated a location, or destination, in the reorder buffer 26, and its destination-register number is associated with this location. For a subsequent operation having no dependencies, its associated A and B operand busses 30 and 31 are driven from the register file 24. However, when a subsequent operation has a dependency and refers to the renamed destination register to obtain the value considered to be stored therein, an entry is accessed within the reorder buffer 26. If a result is available therein, it is placed on the operand bus. If the result is unavailable, a tag identifying this reorder buffer entry is furnished on an operand tag bus of A and B-operand tag busses 48 and 49. The result or tag is furnished to the functional units over the operand busses 30, 31 or operand tag busses 48, 49, respectively. When results are obtained from completion of execution in the functional units 20, 21, 22 and 80, the results and their respective result tags are furnished to the reorder buffer 26, as well as to the reservation stations of the functional units, over five bus-wide result busses 32 and result tag busses 39.

Results generated by functional units are communicated to reorder buffer 26 using five 41-bit result busses 32 and five associated result tag and status busses 39. Of the five result and result tag and status busses, four are general purpose busses for forwarding integer and floating point results to the reorder buffer. Additional fifth result and result tag and status busses are used to transfer information, that is not a forwarded result, from some of the functional units to the reorder buffer. For example, status information arising from a store operation by the load/store functional unit 80 or from a branch operation by the branch unit 20 is placed on the additional busses. The additional busses are provided to conserve bandwidth of the four general purpose result busses.

The instruction decoder 18 dispatches ROPs "in-order" to the functional units. This order is maintained by the order of entries within reorder buffer 26. The functional units queue ROPs for issue when all previous ROPs in the queue have completed execution, all source operands are available either via the operand busses or result busses, and a result bus is available to receive a result. Thus, the functional units complete ROPs "out-of-order". In this manner, the dispatch of operations does not depend on the completion of the operations so that, unless the processor is stalled by the unavailability of a reservation station queue or an unallocated reorder buffer entry, the instruction decoder 18 continues to decode instructions regardless of whether they can be promptly completed.

A suitable unit for a RISC core is disclosed in U.S. patent application Ser. No. 08/146,382 filed on Oct. 29, 1993 (David B. Witt and William M Johnson, "High Performance Superscalar Microprocessor," Attorney Docket Number M-2518), which is incorporated herein by reference in its entirety.

Figure 2:
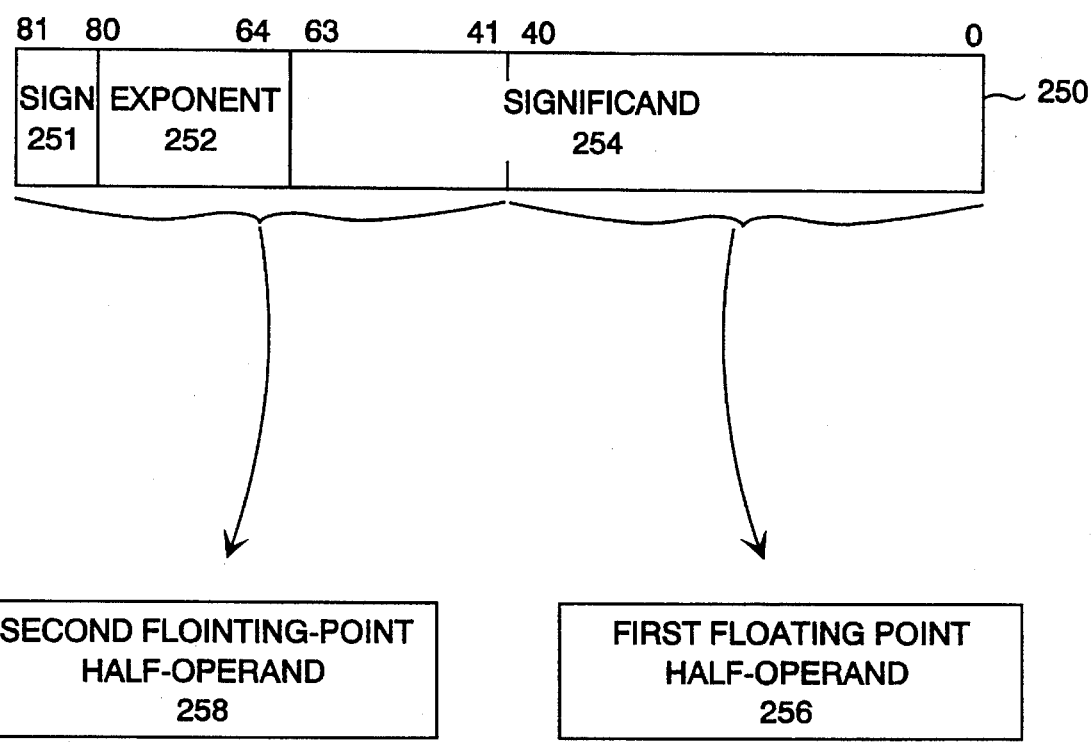
FIG. 2 is a pictorial representation illustrating the format of, respectively, an extended precision number and an extended precision number segmented into half-operands.

The instruction decoder 18 dispatches an integer ROP using a single dispatch position which specifies one A operand, one B operand and one destination register. Illustrative instruction decoder 18 dispatches a floating point ROP as two associated "half-ROPs", or more generally "sub-ROPs", so that two associated A-operands and two associated B-operands are allocated as "half-operands", or "suboperands". The floating point half-operands are pictorially illustrated by FIG. 2. A full floating point register 250, shown in FIG. 2, is allocated in the form of two half-operands, shown by the first and second floating point half-operands 256 and 258. For an A-operand, one of a pair of half-operands (e.g. 256) is placed in an A-operand position corresponding to a first associated floating point opcode. The second of the pair of half-operands (e.g. 258) is placed in an A-operand position corresponding to a second associated floating point opcode. Likewise, a pair of B half-operands is placed into B-operand positions that correspond to the pair of opcodes. Instruction decoder 18 initiates access to the A and B-operands via pointers 36 and 37 to register file 24 and reorder buffer 26. Instruction decoder 18 dispatches half-ROPs to floating point functional unit 22 by communicating "half-opcodes" on two of the four opcode/type busses 50. For a floating point instruction, decoder 18 concurrently dispatches, in a single dispatch window, two ROPS having the two sets of A and B half-operands from, respectively, two of the four dispatch positions.

In an illustrative embodiment, opcodes for the two floating point half-ROPs are designated as a "dummy" opcode and an associated "actual" opcode. For example, a dummy floating point opcode (e.g. FPFILL) is allocated A and B half-operands, each associated with bits <40:0> of the full 82-bit floating point A and B operands, in one dispatch position of the dispatch window. In the immediately following dispatch position of the window, the actual floating point operation code is allocated A and B half-operands, each associated with bits <81:41> of the full floating point A and B operands. When floating point functional unit 22 executes the ROP, it merges the half-opcodes to execute a single ROP. For example, a floating point add instruction, FADD, may be dispatched in the following manner:

| DISPATCH POS | OPCODE/ TYPE | A-OPERAND | B-OPERAND |
|---|---|---|---|
| 1 | FPFILL | <40:0> | <40:0> |
| 2 | FADD | <81:41> | <81:41> |
| 3 | — | — | — |
| 4 | — | — | — |

Other ROPs may be dispatched in window positions 3 and 4. A half-ROP pair is dispatched in one window.

In other embodiments, a processor 10 may divide the operands into more than two sub-operands. For example, rather than segmenting an operand field into two half-operands, an operand may be divided into three or more suboperands which are operated upon via the dispatch of a like number of sub-ROPs.

Reorder buffer 26, register file 24, non-floating point functional units and various busses, including operand, tag, result and writeback busses, handle floating point half-ROPs as two independent and unrelated ROPs. However, instruction decoder 18, which segments half-ROPs, and floating point functional unit 22, which recombines half-ROPs prior to execution, treat half-ROPs as related entities. In this manner, floating point operands are communicated among the floating point unit and other functional blocks on integer data paths.

Figure 3:
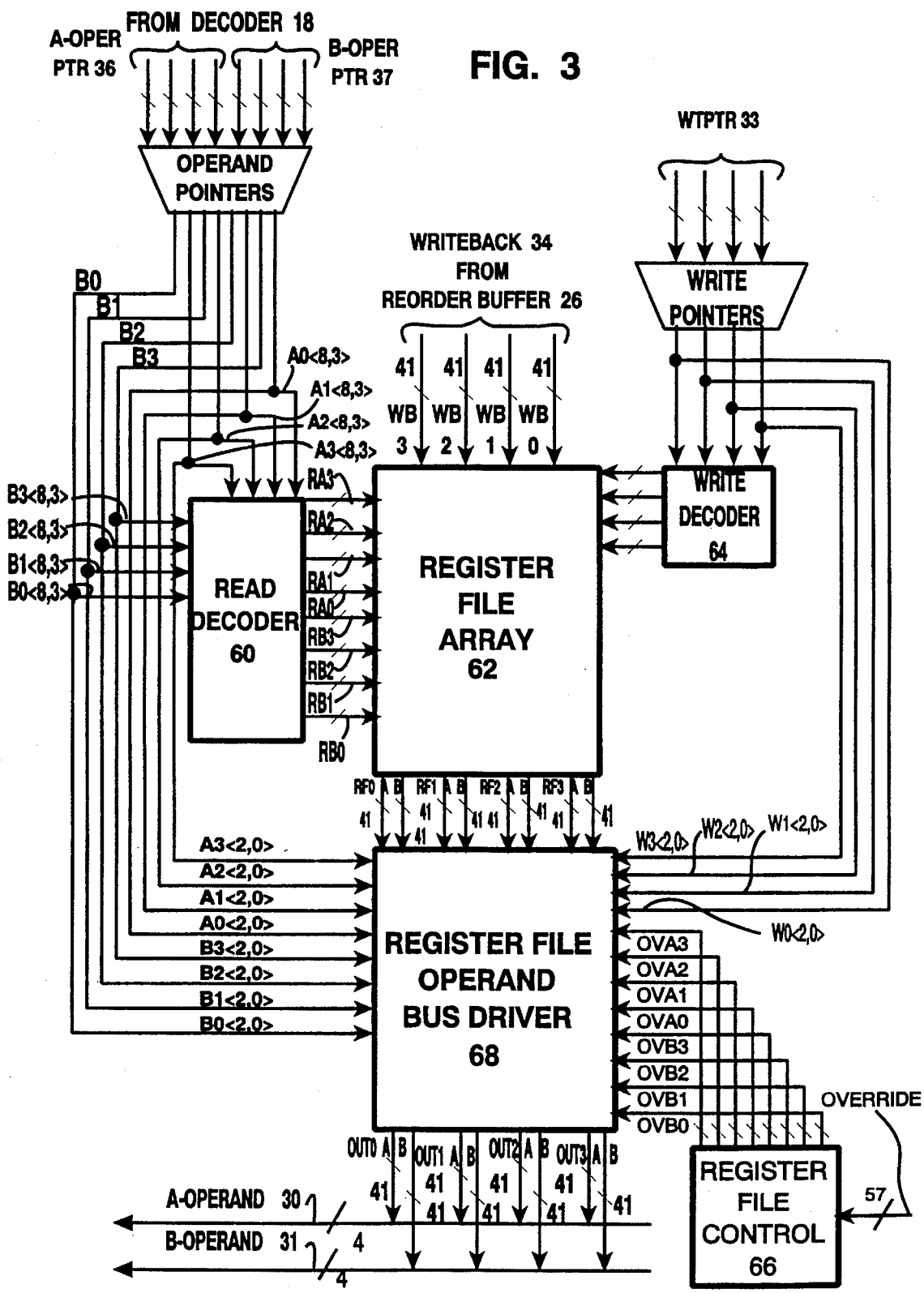
FIG. 3 is an architecture-level block diagram of a register file within the processor of FIG. 1.

A detailed illustration of the register file 24 is shown in FIG. 3. The register file 24 includes a read decoder 60, a register file array 62, a write decoder 64, a register file control 66 and a register file operand bus driver 68. The register file array 62 includes multiple addressable storage registers for storing results operated upon and generated by processor functional units. FIG. 4 shows an exemplary register file array 62 with forty registers, including eight 32-bit integer registers (EAX, EBX, ECX, EDX, ESP, EBP, ESI and EDI), eight 82-bit floating point registers FP0 through FP7, sixteen 41-bit temporary integer registers ETMP0 through ETMP15 and eight 82-bit temporary floating point registers FTMP0 through FTMP7 which, in this embodiment, are mapped into the same physical register locations as the temporary integer registers ETMP0 through ETMP15.

Figure 5:
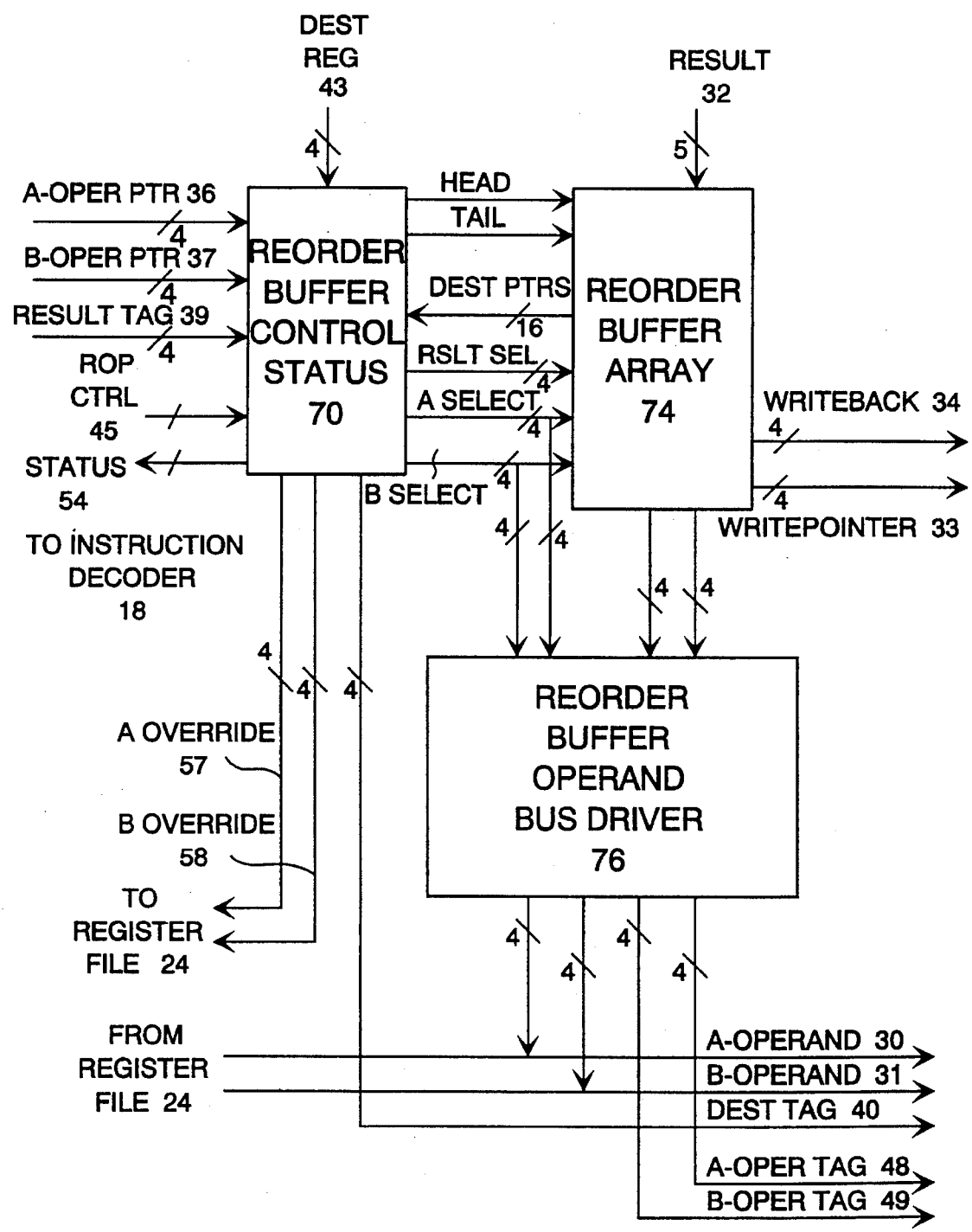
FIG. 5 is an architecture-level block diagram of a reorder buffer within the processor of FIG. 1.

Referring to FIG. 5, reorder buffer 26 includes a reorder buffer (ROB) control and status block 70, a reorder buffer (ROB) array 74, and a reorder buffer (ROB) operand bus driver 76. ROB control and status block 70 is coupled to the A and B-operand pointers 36 and 37 and the destination pointer (DEST REG) busses 43 to receive inputs which identify source and destination operands for an ROP. ROB array 70 is coupled to the result busses 32 to receive results from the functional units. Control signals, including a head, a tail, an A operand select, a B operand select and a result select signal, are conveyed from ROB control and status 70 to ROB array 74. These control signals select ROB array elements that are written with result busses 32 data and read to writeback busses 34, write pointers 33, A and B-operand busses 30 and 31, and A and B-operand tag busses 48 and 49. The A operand select and B operand select signals are applied to the reorder buffer array 74 to designate operand data to be placed on the operand busses 30 and 31. The A operand select and B operand select signals are also applied directly to the reorder buffer operand bus driver 76 to drive the A and B-operand tag busses 48 and 49, when data is not available in the register file 24 or the reorder buffer 26. Sixteen destination pointers, one for each reorder buffer array element, are conveyed from ROB array 74 to ROB control and status 70 for implementing dependency checking.

ROB array 74 is a memory array under the control of the ROB control and status block 70. As the instruction decoder 18 dispatches ROPs, it places pointers on the four destination pointer (DEST REG) busses 43. ROB control status 70 then allocates an entry of ROB array 74 and writes the destination pointer into the DEST PTR field of the allocated entry.

As operations are executed and results are placed on the result busses 32 by the functional units, ROB control and status 70 accesses pointers from the result tag busses 32 which designate the corresponding ROB array entries to receive data from the result busses 32. ROB control 70 directs writing from the result busses 32 to the ROB array 74 using four result select pointers.

Figure 6:
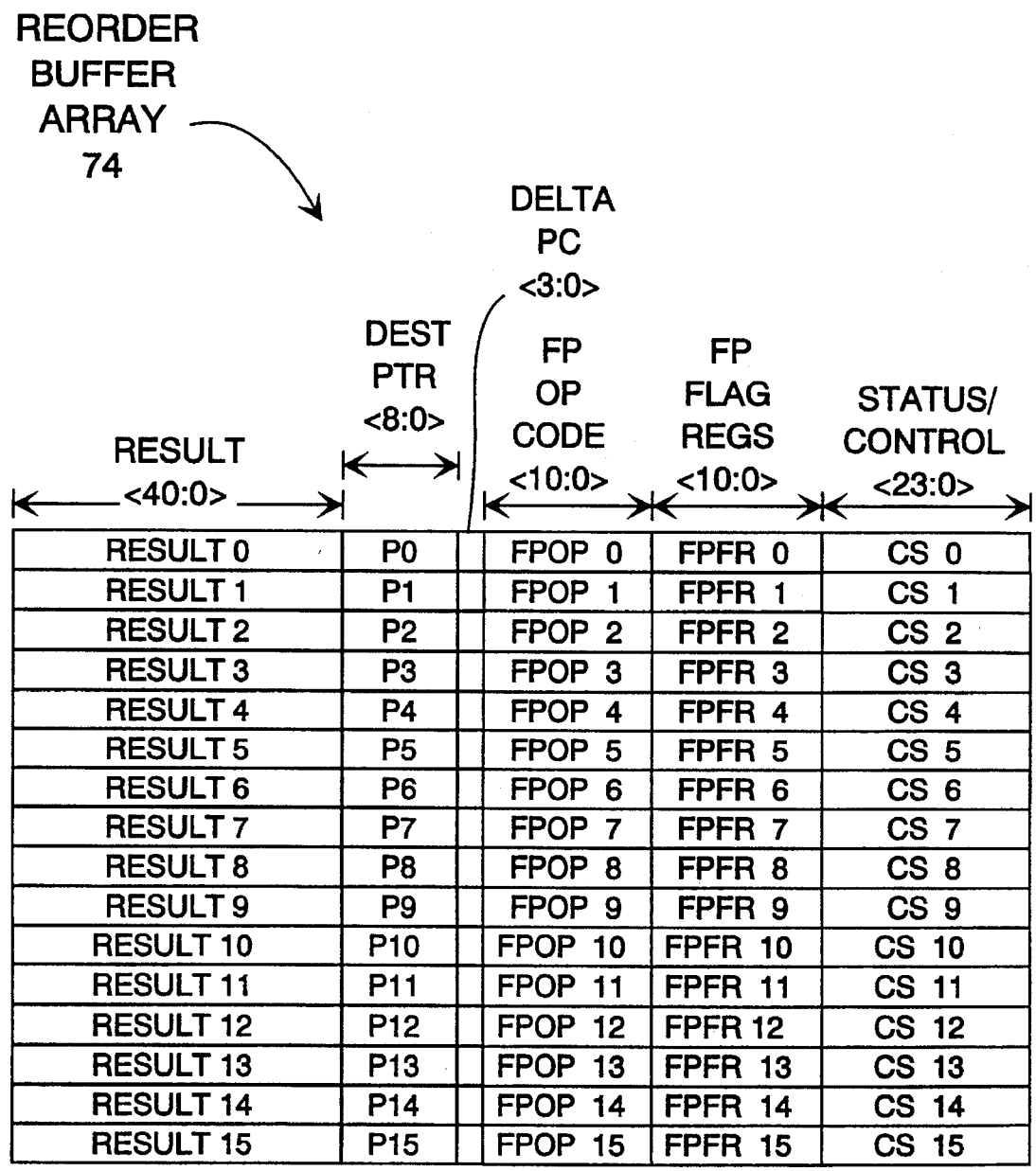
FIG. 6 is a pictorial representation illustrating a memory format within the reorder buffer of FIG. 5.

FIG. 6 depicts an example of a reorder buffer array 74 which includes sixteen entries, each of which includes a result field, a destination pointer field and other fields for storing control information. A 41-bit result field is furnished to store results received from the functional units. Two reorder buffer entries are used to store a floating point result. Integer results are stored in 32 of the 41 bits and the remaining nine bits are used to hold status flags.

The destination pointer field (DEST PTR<8:0>) of each ROB array 74 entry designates a destination register in register file 24. Data from the result field is communicated from an ROB array 70 entry to the register file 24 via one of the writeback busses 34 and driven into the designated destination register during write-back by placing the destination pointer field onto a pointer of the writepointers 33. ROB control and status 70 receives the operand pointers and the destination pointer from instruction decoder 18 via, respectively, the A and B-operand pointers 36 and 37 and the destination register (DEST REG) busses 43, and writes the destination pointer in the destination pointer (DEST PTR<8:0>) field of the ROB array 74. When an ROP is dispatched, reorder buffer 26 accomplishes dependency checking by simultaneously testing the destination pointer (DEST PTR<8:0>) fields of all sixteen elements of reorder buffer array 74 against A and B-operand pointers 36 and 37 to determine whether a match, identifying a data dependency, exists between a destination pointer and the A or B-operand pointers.

When ROB control and status 70 detects a data dependency at dispatch, it overrides the reading of any dependent operand in a register file array 62 entry by setting bits of an A operand override bus 57 and a B operand override bus 58 which are applied to the register file operand bus driver 68. Override busses 57 and 58 include override signals for each operand bus. If ROB control and status 70 determines that a source operand is available in either register file 24 or reorder buffer 26, the source operand is placed on a bus of operand busses 30 or 31 for access by the functional units.

ROB control and status 70 retires an ROP by placing the result field of an ROB array 74 element on one of the writeback busses 34 and driving the write pointer 33 corresponding to the writeback bus with the destination pointer. Write pointer 33 designates the register address within register file 24 to receive the retired result. For write-back of integer data, low order 32 bits <31:0> of the result hold integer data, while high order bits <37:32> are error flags EFLAGS 71 used to update a status flags 25. For floating point data, separate status busses 38 communicate flags to the reorder buffer 26, where the flags are stored until they are conveyed to a floating point status register (not shown) when the floating point ROP is retired.

Figure 7:
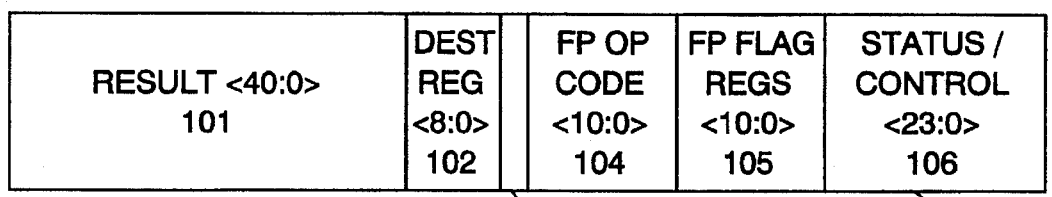
FIG. 7 is a pictorial representation which depicts multiple bit fields within a reorder buffer array element of a plurality of such elements within the reorder buffer of FIG. 5.
Figure 8:
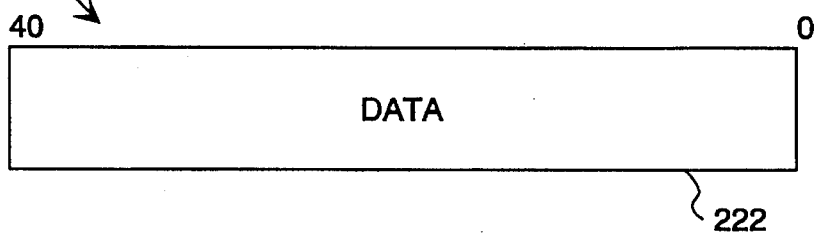
FIGS. 8, 9, 10, 11 and 12 are pictorial depictions which illustrate formats of the result bit field of the reorder buffer array element of FIG. 7, including formats for, respectively, a half-operand extended precision floating point number, a doubleword integer, a word integer, a byte integer and an address for a branch instruction.
Figure 9:
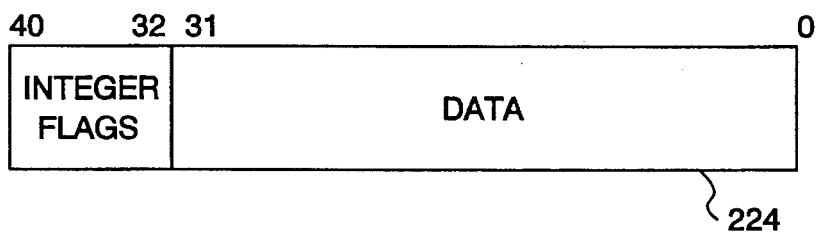
Figure 10:
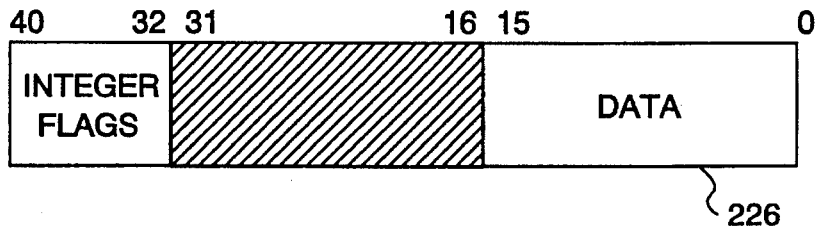
Figure 11:
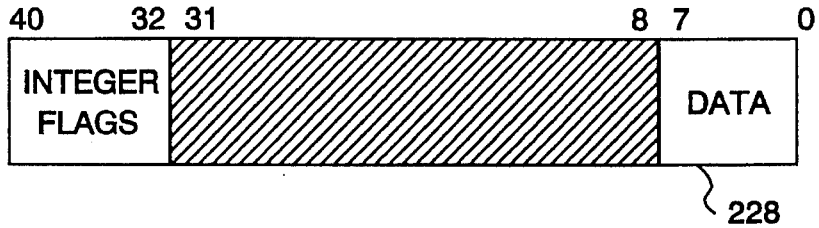

Each reorder buffer array 74 element 220, depicted in FIG. 7, includes a 41-bit result field 101, a 9-bit destination pointer field 102, a 4-bit delta PC field 103, an 11-bit floating point operation code field 104, an 11-bit floating point flag register field 105 and a 24-bit status/control field 106. For floating point operands, result field 222, shown in FIG. 8, holds a 41-bit "half-result" of the floating point operation. For integer operations, bits <40:32> of the 41-bit result field hold integer flag registers as is shown in result fields 224, 226 and 228 of FIGS. 9, 10 and 11, respectively. For integer operations yielding results having widths of 8 or 16 bits, additional bits are cleared by the functional unit that generates the result in the form depicted in result fields 228 and 226 of FIGS. 10 and 11, respectively.

Figure 12:
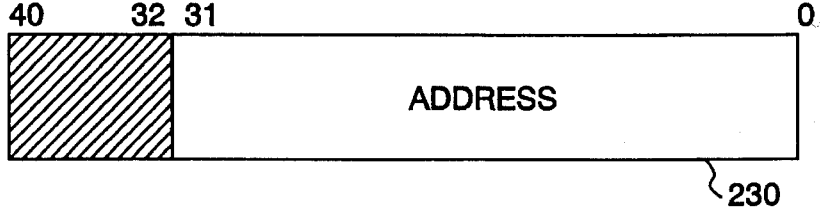

For branch operations, result field 230 shown in FIG. 12 holds the logical address of the program counter as determined by execution of a branch ROP by branch unit 20.

Referring to FIG. 7, destination pointer field 102 specifies a destination register of register file 24. Floating point opcode field 104 is set to a subset of the bits of a floating point operation code allocated to a reorder buffer entry. The floating point flag register field 105 holds the state of the floating point flags arising from a floating point operation. Floating point flags hold information relating to precision, underflow, overflow, zero divide, denormalized operand and invalid operand errors detected by the floating point functional unit 22. For integer operands, a corresponding flag field is not necessary since flags arising from integer operations are held in bits <40:32> of the 41-bit result field 101. Status/control field 106 denotes the status of the operand, for example, whether a ROB entry is allocated, a branch is incorrectly predicted or performance of an operation has caused an exception or error condition.

Figure 13:
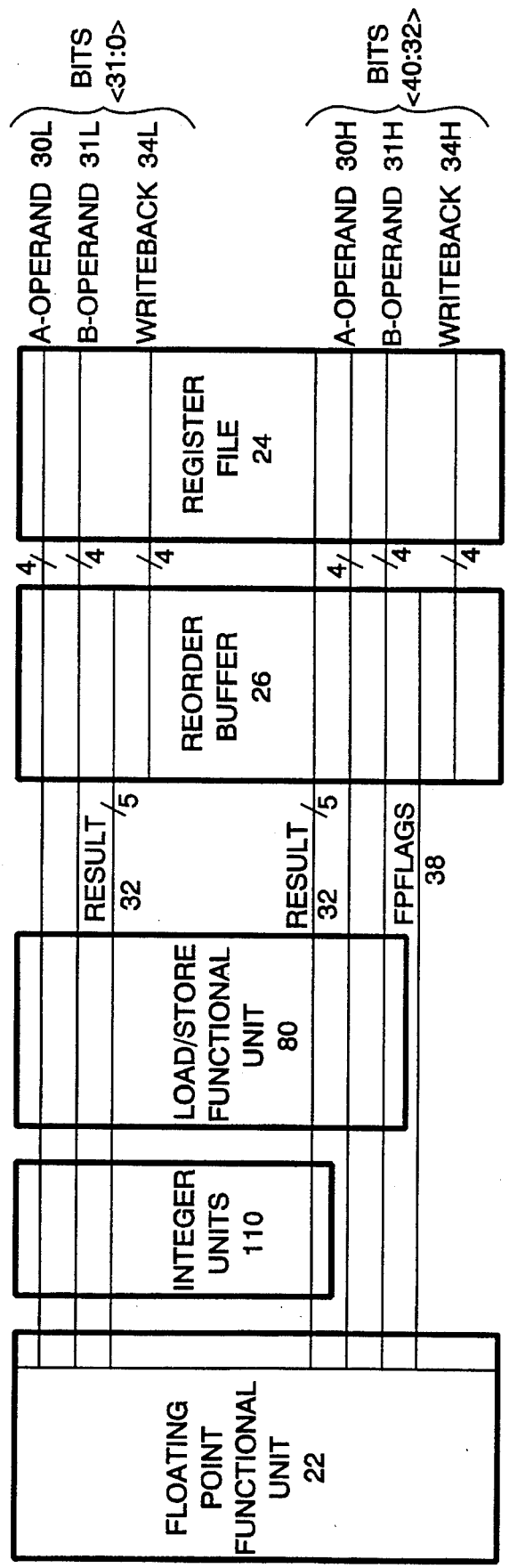
FIG. 13 is a schematic diagram of a layout of a mixed floating point/integer processor core.

FIG. 13 depicts a schematic layout diagram of a mixed floating point/integer core with a 41-bit data path traversing register file 24, reorder buffer 26 and floating point functional unit 22. This data path includes the A and B-operand busses 30 and 31, the result busses 32 and the writeback busses 34. Only bits <31:0> of the A and B-operand busses 30 and 31 are interconnected with the integer functional units, such as unit 21. The lines of the busses are shown superimposed upon the register file 24, reorder buffer 26 and integer units 110 to illustrate that the data path has a bit-by-bit correspondence for the data lines of the busses and memories in the other functional blocks. The lines of the busses are shown extending only partially into the floating point functional unit 22 to illustrate that the bit structure of the busses extends only into the floating point reservation stations and result driver. In the operational interior of the floating point functional unit 22, pairs of 41-bit operands are combined into the 82-bit extended form for processing.

The four respective pairs of 41-bit A and B-operand busses 30 and 31 interconnect among the functional units, reorder buffer 26 and register file 24 and extend from the floating point functional unit 22 reservation stations, across the integer units and the reorder buffer 26 and substantially across the register file 24. The areas of the core that contain the integer units and underlie bits <31:0> of the operand busses include reservation station registers for holding the operand data. Bits <41:32> of the A and B-operand busses 30 and 31 pass by the integer units without interconnecting with the units.

The five 41-bit result busses 32 interconnect among the functional units and reorder buffer 26 and extend from the floating point functional unit 22 result bus drivers, across the integer units and substantially across the reorder buffer 26. Essentially all of the 41 bits of the result busses 32 interconnect with the integer units so that result data is communicated in bits <31:0> and integer status flags are communicated in bits <41:32>. In the illustrative embodiment of the microprocessor the number of defined status bits utilize only bits <37:32> of the result busses 32.

The four 41-bit writeback busses 34 communicate result data from reorder buffer 26 to register file 24 and extend substantially from one side of the reorder buffer 26 substantially to the opposite side of the register file 24.

It is advantageous that, with few exceptions (e.g. operand bits <41:32> and result bus bits <41:38>), each bit of each bus in the data path only traverses a functional block with which it interconnects.

This layout represents a mixed floating point and integer core in which the total bus width (the sum of all bits) of all buses of the data path is substantially constant throughout the integer and floating point functional units.

The layout embodiment shown in FIG. 13 is advantageous because it yields a dense core. The floating point functional unit 22 and the register file 24 preferably are located at the ends of the core. The floating point functional unit 22 has its own internal bus structure, so that the A-operand busses 30, the B-operand busses 31, and the result busses 32 need not traverse it. Moreover, the floating point functional unit 22 is large, consuming about twenty percent of the core. Accordingly, positioning the floating point functional unit 22 such that the A-operand busses 30, the B-operand busses 31, and the result busses 32 are routed past it would unnecessarily consume die space. Similarly, the register file 24 does not use the result busses 32, so that the result busses 24 need not traverse it. Moreover, the register file 24 is large, consuming about thirty percent of the core. Accordingly, positioning the register file 24 such that the result busses 32 are routed past it would unnecessarily consume die space. The load/store functional unit 80, which consumes about twenty-five percent of the core, is located between the floating point functional unit 22 and the reorder buffer 26 because it is traversed by the A and B operand busses 30 and 31 and by the result busses 32. The integer units 110, including the branch unit 20, are located between the floating point functional unit 22 and the reorder buffer 26 because they are traversed by the result busses 32 and the bits <31:0> of the A and B operand busses 30 and 31. Bits <40:32> of the operand busses 30 and 31 bypass the integer units 110, however the adverse impact on the core density is minor, since the integer units 110 are relatively small, consuming only about ten percent of the core.

FIG. 13 also shows a floating point flag bus 38 which bypasses the integer units 110 to reach the reorder buffer 26. The adverse impact of the bus 38 on core density is minor, since it is only a single bus of eleven bits. Note that, because the integer flags are communicated on various 41-bit busses which are also used for floating point data transfer, advantageously thirteen separate 6-bit integer flag busses which would otherwise be associated with the eight operand busses 30 and 31 and the five result busses 32 are avoided.

While FIG. 13 shows a core having a constant 41-bit width data path across the floating point functional unit 22, the integer units 110, the load/store functional unit 80, the reorder buffer 26, and the register file 24, other core layouts may not have a constant data path width throughout but still benefit from having bus structures wide enough to accommodate both floating point data and the combination of integer data and integer flags. For example, in an alternative embodiment (not shown) in which the integer units are larger than the register file, the register file might be positioned within the core and the integer units might be positioned at one end of the core. In this event, the 41-bit pitch of the result busses 32 would be extended but only the bits <31:0> of the A and B operand busses need be extended. In this alternative layout, the A and B operand busses 30 and 31 and the result busses 32 would need to traverse or bypass the register file. However, advantageously the extension of bits <40:0> of the result busses 32 to the repositioned integer units would accommodate both floating point data and the combination of integer data and integer flags.

Figure 14:
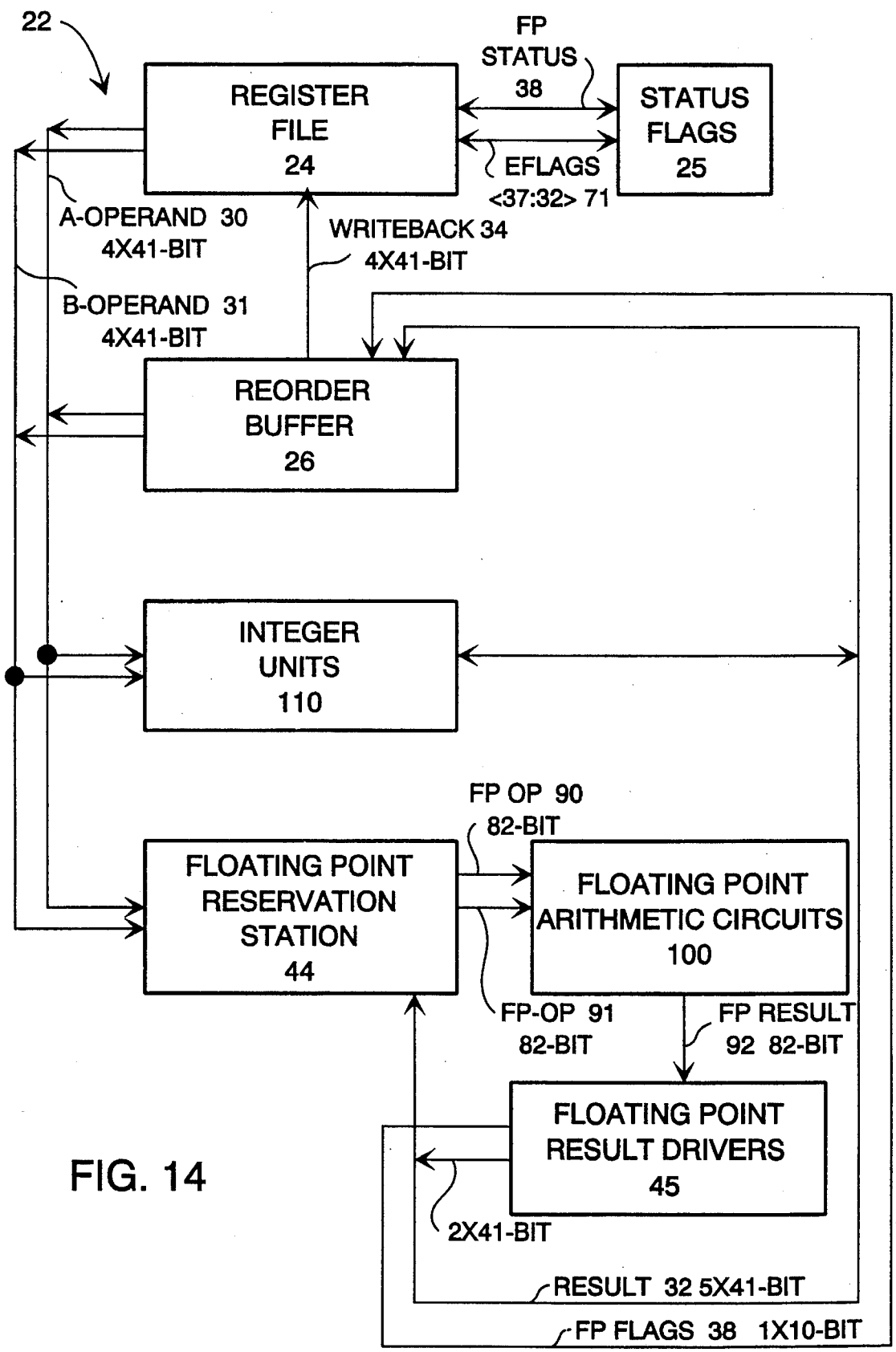
FIG. 14 is a schematic block diagram illustrating data flow and dimensions of data paths within the processor of FIG. 1.

FIG. 14 is a block diagram that illustrates floating point connections of a processor embodiment in which the data path width is less than the internal data path width of the floating point functional unit 22. Preferably, the internal data path width of the floating point functional unit 22 is an integer multiple of the data bus width.

In the illustrative architecture, the operand 30 and 31, result 32 and writeback 34 busses are expanded from a 32-bit data path to a 41-bit data path to accommodate one-half of an 82-bit extended precision floating point variable. Integer ROPs are dispatched in the same manner as a purely integer implementation when the data path is expanded. However, operands associated with ROPs are assigned to bits <31:0> of the four pairs of A and B-operand busses 30 and 31. When integer operands are loaded onto the busses, high order nine bits <40:32> are not used to communicate integer data, while low order 32 bits <31:0> encode the integer data and communicate it to an integer functional unit. When a floating point ROP is dispatched, all 41 bits communicate data to a floating point reservation station 44, which combines the two half-ROPs and locally merges 41-bit operands to form an 82-bit operand. 82-bit operands are sent to a floating point arithmetic circuit 100 internally via two 82-bit floating point operand busses 90 and 91 and communicated from the arithmetic circuit 100 to floating point result drivers 45 on an 82-bit floating point result bus 92. Standard extended precision numbers are 80 bits wide, although two extra bits in the exponent field may be applied to accommodate a greater data range of internal floating point numbers.

Floating point flags communicate over a FP flag bus 112. Because there is only a single floating point function unit 22 within the processor 10, a single FP flag bus 112 is sufficient and the routing and placement of the floating point functional unit 22 and the floating point flag bus 112 is improved. Although integer functional units 110 also generate flags, corresponding integer flag busses are not necessary because result bus 32 bits <40:32>, which would otherwise not be utilized, are employed to communicate integer flags. Communicating integer flags over 41-bit busses is advantageous for preventing inclusion of additional dedicated integer flag busses which complicate processor layout and consume die space.

When source operands are available and two result busses are available, the reservation station 44 issues the ROP, such as a floating point multiply, divide or other ROP-specified operation, and the arithmetic circuit 100 calculates an 82-bit result. Floating point result drivers 45 divide the 82-bit result into 41-bit segments, places the segments onto two of the four general purpose result busses 32 and sets flags on the status busses 38. The floating point functional unit assigns the high order bits <40:32> of a floating point result to correspond to the least significant nine bits of a floating point number, even though they are numbered in the higher bit positions. This is done because shifting the data field in this manner allows the sign and exponent of the high order 41-bits of floating point data to be read in a 32-bit integer data access.

Various integer functional units, which are depicted in combination as integer units 110, operate on 32-bit data. Integer units 110, in addition to writing a result to bits <31:0> of the result busses 32, write result flags to bits <40:32> of the result busses 32. The result busses 32 are connected to the reorder buffer 26, which temporarily stores the result data. Reorder buffer 26 retires the 41-bit result to register file 24 without regard for whether data are floating point or integer.

Figure 15:
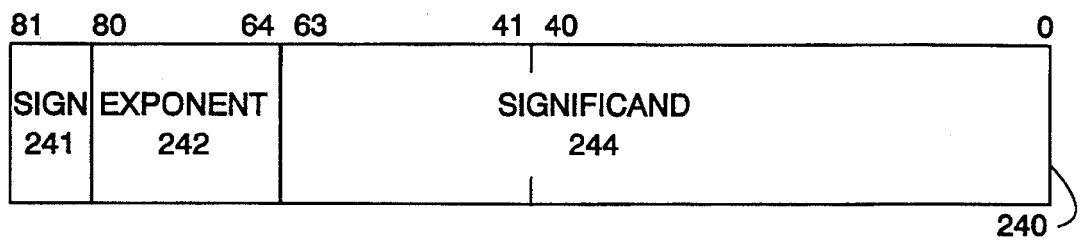
FIGS. 15 and 16 are pictorial illustrations depicting formats of, respectively, an extended precision number, an extended precision number decomposed into half-operands and bit fields within the lower order half-operand, all of which are operated upon by functional units of the FIG. 1 processor.
Figure 16:
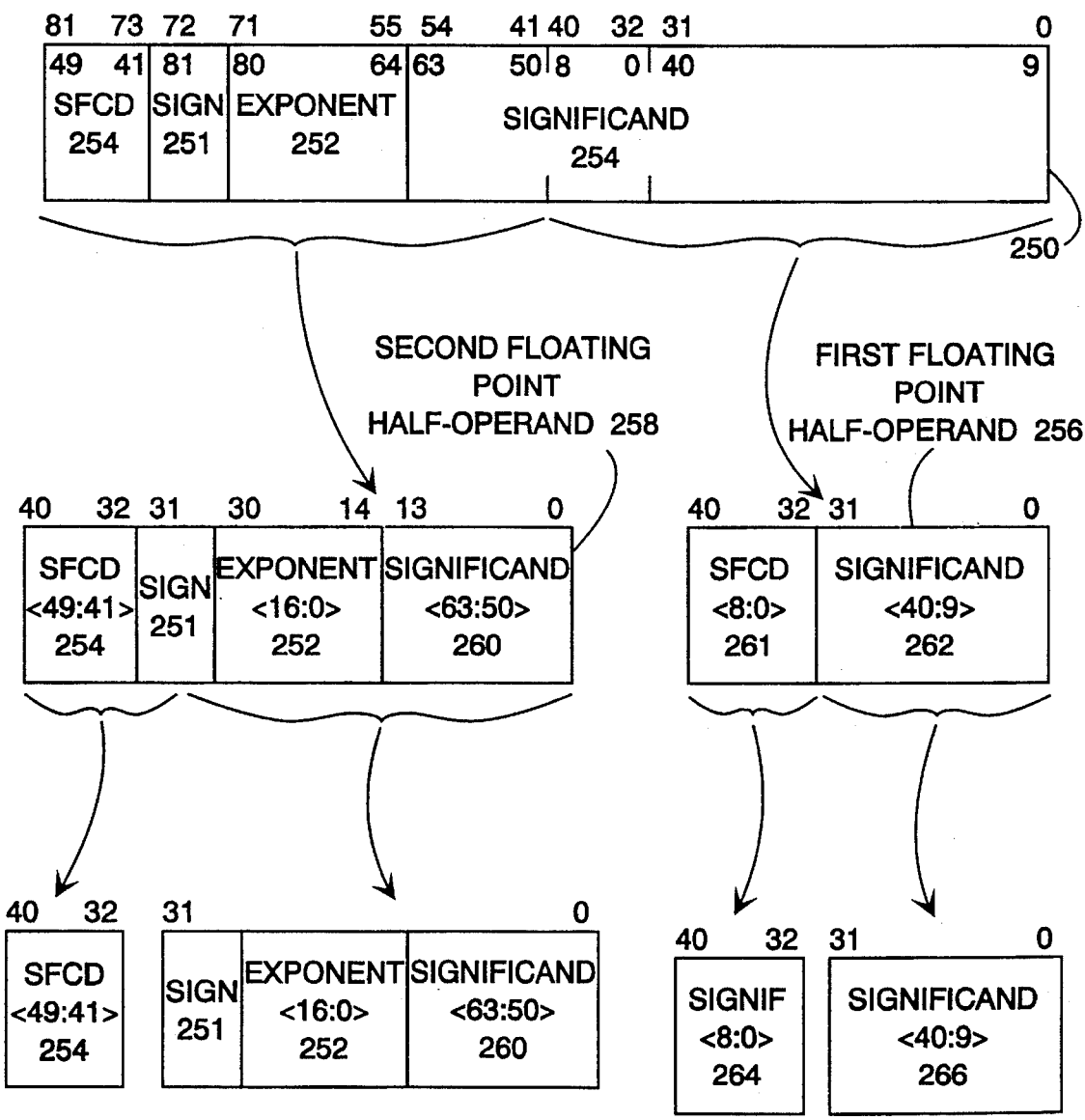

FIG. 15 depicts bit fields of a standard 82-bit floating point number. Most significant bits <81:42> represent a sign bit 241, a 19-bit exponent field 242 and the high order 21 bits of the 62-bit significand field 244. The significand field of a floating point number represents an integer number, which is multiplied by two raised to the power designated by the exponent field. The processor 10 of the present embodiment configures floating point numbers in the manner illustrated in FIG. 16, in which an 82-bit field 250 is separated into two 41-bit fields. In the high order 41-bit field, the 9 least significant of significand bits <59:41> are shifted to a significand field <81:73> 254. A sign field 251 and an exponent field 252 are shifted nine bits lower in significance. In the low order 41-bit field of the floating point bits 250, a significand field <8:0> is shifted into high order bits <40:32> and a significand field <40:9> is shifted into low order bits <31:0> of the 41-bit field.

82-bit floating point register 250 is segmented into first floating point half-operand 256 and second floating point half-operand 258. Second floating point half-operand 258 is shifted right by nine bits and significand bits <49:41> 254 are transferred to the most significant bit locations. Thus sign 251 and exponent <16:0> 252 are readable and writable in a 32-bit integer access.

Figure 17:
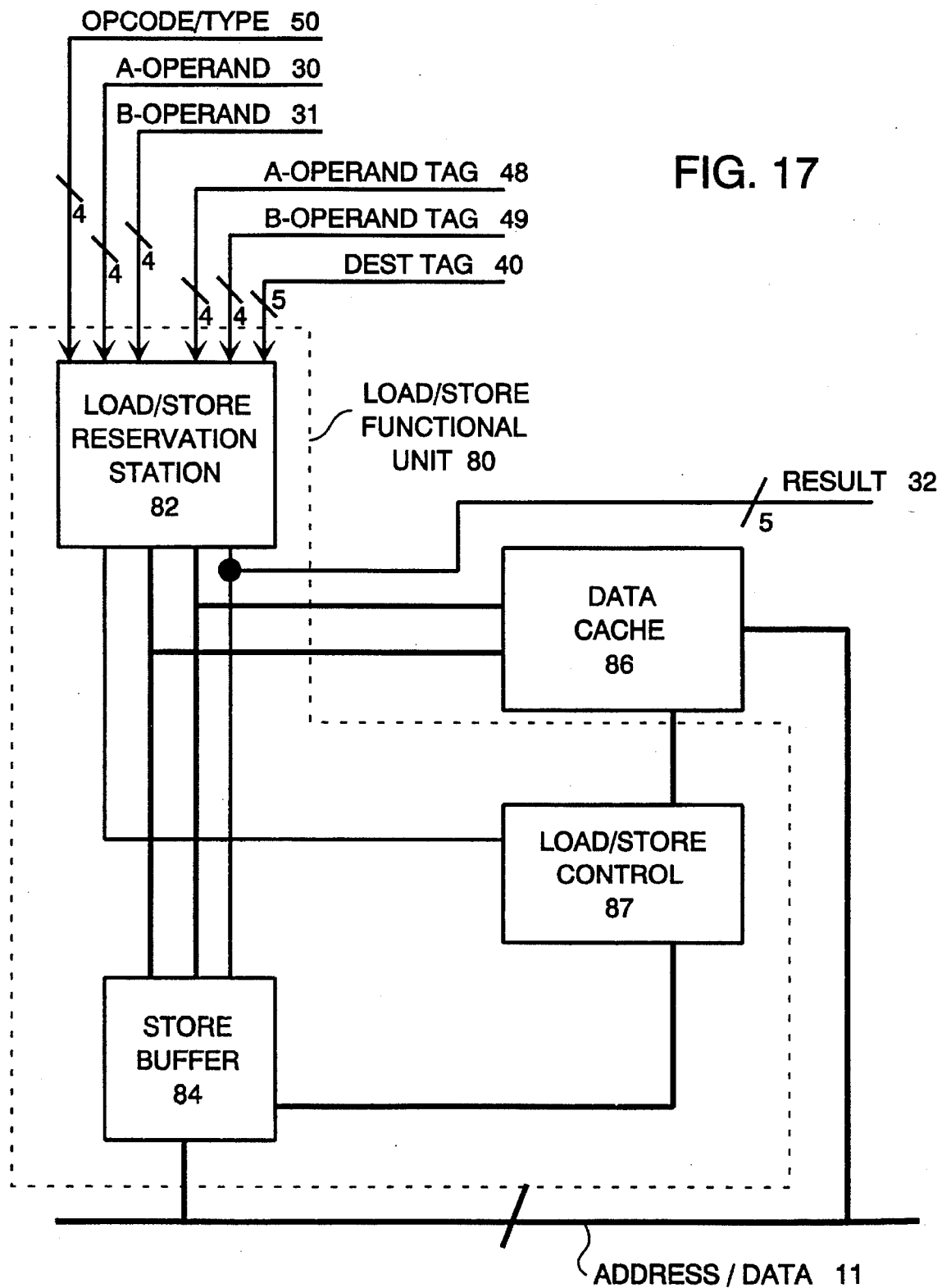
FIG. 17 is an architecture-level block diagram of a load/store functional unit of the FIG. 1 processor.

Load/store functional unit 80 controls integer and floating point load and store operations. Load/store unit 80 can simultaneously execute up to two load operations for accessing data from the data cache 86 and forwarding the data to result busses 32. Referring to FIG. 17, load/store functional unit 80 includes a reservation station 82, a store buffer 84 and a load/store control 87. The load/store reservation station 82 is dual ported. Each port is connected to the store buffer 84 and the data cache 81 by a channel, which comprises 40-bits of data and a suitable number of address bits. Load/store reservation station 82 is a FIFO buffer which queues load/store requests. It receives operation codes from opcode/type busses 50 and operates upon results on the A and B-operand busses 30 and 31 that are multiplexed at the input to load/store reservation station 82.

A mixed integer and floating point structure allows the processor to perform loading and storing operations for both integer and floating point data using the same load/store functional unit 80. Within the load/store functional unit, the data operands are 41-bit and represent either an integer, a single precision number, part of a double precision number or part of an extended precision number. For integer data, the most significant eight bits are not used. Load/store functional unit 80 functions in the same manner for both integer and floating point operands. Therefore, by mixing the integer and floating point data path, only a single load/store functional unit 80 is used, reducing the amount and complexity of processor circuitry. A suitable load/store unit is disclosed in U.S. patent application Ser. No. 08/146,376 filed on Oct. 29, 1993 (William M. Johnson et al., "High Performance Load/Store Functional Unit and Data Cache," Attorney Docket Number M-2281), which is incorporated herein by reference in its entirety.

While the invention has been described with reference to particular embodiments, it will be understood that the embodiments are illustrative and that the invention scope is not so limited. Many variations, modifications, additions and improvements to the embodiment described are possible. For example, rather than segmenting an operand field into two half-operands, an operand may be divided into three or more suboperands that are operated upon via the dispatch of a like number of suboperations, which are consolidated into a single operation prior to its execution. Furthermore, the number of bits in the various structures and busses is illustrative, and may be varied. The size of the register file and the reorder buffer, the number of operand buses and operand tag busses, the number of result buses, the number of writeback buses, and the type and number of functional units, such as the number of floating point functional units, are illustrative, and may be varied. These and other variations, modifications, additions and improvements may fall within the scope of the invention as defined in the following claims.

What is claimed is:

1. A processor core for executing operations utilizing operand data and being of integer and floating point types, the processor core comprising:

a plurality of $n_1$-bit operand busses and an $n_1$-bit result bus, $n_1$ being a positive integer number;

an integer functional unit coupled to the operand busses through a plurality of $n_2$-bit inputs and coupled to the result bus through an $n_2$-bit output, $n_2$ being a positive integer number less than or equal to $n_1$; and a floating point functional unit coupled to the $n_1$-bit operand busses through a plurality of $n_1$-bit inputs, and coupled to the result bus through an $n_1$-bit output, the floating point functional unit comprising:

means for combining a plurality of $n_1$-bit operands from the floating point functional unit inputs into $n_3$-bit operand data;

means for executing a floating point operation utilizing the $n_3$-bit operand data;

means for generating an $n_3$-bit result;

means for segmenting the $n_3$-bit result into a plurality of $n_1$-bit partial results; and means for sending the partial results to the floating point functional unit outputs, the number of bits $n_3$ being greater than the number of bits $n_1$;

an $n_1$-bit writeback bus;

a reorder buffer for storing results of speculatively executed operations having outputs coupled to the $n_1$-bit operand busses and to the $n_1$-bit writeback bus and an input coupled to the result bus; and a register file for storing results of speculatively executed operations when the results are no longer speculative having outputs coupled to the $n_1$-bit operand busses and input coupled to the $n_1$-bit writeback bus.

2. A processor core as in claim 1, wherein:

the processor core is disposed in a generally planar arrangement of substantially rectangular segments each segment extending in a first dimension and the segments being sequentially stacked in a second dimension, wherein the operand, result and writeback busses extend in the second dimension across a plurality of the segments;

the register file being ordered in a first segment at one end of the planar arrangement;

the reorder buffer being ordered in a second segment adjacent to the first segment;

a plurality of integer functional units being ordered in a third segment adjacent to the second segment; and the floating point functional unit being ordered in a fourth segment adjacent to the third segment.

3. A processor as in claim 2, wherein:

the operand busses extend in the second dimension substantially across the register file, completely across the reorder buffer and the integer functional units and partially across the floating point functional unit;

the result bus extends in the second dimension substantially across the reorder buffer, completely across the integer functional units and partially across the floating point functional unit so that the number of operand and result bus data lines that extend across a functional unit but do not couple to the functional unit and the length of operand and result bus data lines are reduced; and the writeback bus extends in the second dimension substantially across the reorder buffer and substantially across the register file.

4. A processor as in claim 1, wherein the number of integer bits $n_2$ is 32, the number of floating point bits $n_3$ is 80-or-more and the number of bussed bits $n_1$ is 40-or-more.

* * * * *